United States Patent [19]
Tanioka

[11] Patent Number: 6,118,547
[45] Date of Patent: Sep. 12, 2000

[54] IMAGE PROCESSING METHOD AND APPARATUS

[75] Inventor: Hiroshi Tanioka, Yokohama, Japan

[73] Assignee: Canon Kabushiki Kaisha, Tokyo, Japan

[21] Appl. No.: 08/896,098

[22] Filed: Jul. 17, 1997

[30]     Foreign Application Priority Data

| Jul. 17, 1996 | [JP] | Japan | 8-187477 |
| Jul. 17, 1996 | [JP] | Japan | 8-187604 |

[51] Int. Cl.⁷ .................................................. H04N 1/405
[52] U.S. Cl. ............................................. 358/1.9; 358/456
[58] Field of Search ................................. 382/237, 252, 382/270; 358/534, 456, 1.9, 535, 536, 457, 458, 466, 298, 460; 395/109

[56]         References Cited

U.S. PATENT DOCUMENTS

| 5,515,456 | 5/1996 | Ballard | 382/252 |
| 5,675,716 | 10/1997 | Shu | 395/109 |
| 5,742,405 | 4/1998 | Spaulding et al. | 358/456 |
| 5,757,976 | 5/1998 | Shu | 382/252 |
| 5,760,918 | 6/1998 | Tanioka et al. | 382/252 |
| 5,870,503 | 2/1999 | Kumashiro | 382/252 |

*Primary Examiner*—Scott Rogers
*Attorney, Agent, or Firm*—Fitzpatrick, Cella, Harper & Scinto

[57]         ABSTRACT

Provided is an image processing apparatus in which high-quality image representation is possible at very low cost even if high image resolution is obtained. The apparatus includes a first halftone processor for pseudo-halftoning an 8-bit image signal to a 4-bit image signal, an image processor, which comprises a color correcting unit, a converter, a resolution converter, a spatial filter and a gamma corrector, for processing the 4-bit image signal, a second halftone processor for pseudo-halftoning the image-processed 4-bit image signal from the image processor to one bit, and a recorder for outputting an image based upon the 1-bit signal. In another aspect, the amount of calculation required for highly precise color correction processing inclusive of image-quality adjustment processing is large. This has made it necessary to rely upon hardware such as an ASIC, a consequence of which is higher cost. Accordingly, a first halftone processor converts input 8-bit data to 4-bit data and a color correcting unit performs color correction processing, using a LUT conversion, of the 4-bit data. Since the LUT is updated in dependence upon adjustment of image quality performed using a control panel, it is possible for the adjustment to be reflected in real time.

17 Claims, 12 Drawing Sheets

FIG.7

|   |   | * | 7 | 5 |
|---|---|---|---|---|
| 3 | 5 | 7 | 5 | 3 |
| 1 | 3 | 5 | 3 | 1 |

| 0 | 0 | 0 | 0 | 0 |
|---|---|---|---|---|
| 0 | 1 | 2 | 1 | 1 |
| 1 | 2 | * |   |   |

× 1/8

| 1 | 3 | 5 | 3 | 1 |
|---|---|---|---|---|
| 3 | 5 | 7 | 5 | 3 |
| 5 | 7 | * |   |   |

× 1/48

| 5  | 18 | 25 | 18 | 5  |
|----|----|----|----|----|
| 18 | 25 | 37 | 25 | 18 |
| 25 | 37 | *  |    |    |

× 1/256

IMAGE PROCESSING METHOD AND APPARATUS

BACKGROUND OF THE INVENTION

This invention relates to an image processing apparatus, such as a copier, facsimile machine or printer, for processing image signals. More particularly, the invention relates to an image processing apparatus for pseudo-halftoning an input image signal to an image signal having fewer levels than the input levels.

Pseudo-halftone processing in an apparatus of this kind, e.g. a digital copier, generally makes use of the error diffusion method. The error diffusion method expresses halftones artificially by binarizing an 8-bit image signal using a predetermined threshold value and correcting a resultant binarization error by distributing the error to input signals indicative of the positions of pixels to be binarized subsequently, these pixels being adjacent a pixel of interest.

Conventionally, a digital copier of this type reads and records an image at a density of 400 dpi. Recently developed printers, however, have much higher resolution on the order of 600, 720 and 1200 dpi.

In order to raise the resolution of copiers which have a printing function as well, it is required that the image processing section which reads and processes the image be capable of operating at high speed. In addition, the memory of the two-dimensional processing section is required to have a very large storage capacity. This results in problems related to cost. For example, if the resolution of a system is to be raised from 400 to 600 dpi, then, in order to maintain the same copying speed, the processing speed of each image processing section must be increased by a factor of 2.25 owing to the need to read images. Further, in order for a spatial filter composed of a matrix of 5×5 pixels to obtain the same functionality, processing of a wide area of 7×7 pixels or more is required. This means that the storage capacity of a delay memory must also be increased 2.25 times, thereby raising cost.

SUMMARY OF THE INVENTION

Accordingly, an object of the present invention is to provide an image processing method and apparatus through which the number of bits per pixel of a multivalued image signal is halved, thereby making it possible to reduce the scale of processing and halve the size of an image delay memory in a two-dimensional processing section so that a large reduction in cost and an increase in processing speed can be achieved.

Another object of the present invention is to provide an image processing method and apparatus through which a high-quality image can be obtained even if image processing is executed after the number of bits is reduced and this is followed by a further reduction in number of bits.

According to the present invention, the foregoing objects are attained by providing an image processing apparatus comprising first halftone processing means for pseudo-halftoning an L-bit image signal to an M-bit image signal (M<L), image processing means for processing the M-bit image signal, second halftone processing means for pseudo-halftoning the M-bit image signal, which has been processed by the image processing means, to an S-bit image signal (S<M), and output means for producing an output signal based upon the S-bit signal.

In accordance with the present invention, as described above, it is possible to obtain a high-quality image at very low cost even though the resolution of the image is improved.

Another object of the present invention is to provide an image processing method and apparatus through which highly precise color correction processing can be executed at high speed by an inexpensive arrangement.

According to the present invention, the foregoing object is attained by providing an image processing apparatus comprising first converting means for converting an image signal, which is expressed by a first number of bits per pixel, to an image signal expressed by a second number of bits per pixel, image processing means for applying image processing to the image signal expressed by the second number of bits to thereby produce an image signal expressed by a third number of bits, designating means for designating an image-quality adjustment with regard to the image processing means, and updating means responsive to the designation of image-quality adjustment for updating a method of image processing used by the image processing means.

In accordance with the present invention, as described above, the number of bits per pixel of a multivalued image signal is halved when image processing which reflects an image-quality adjustment by the operator is applied to the multivalued image signal. This makes it possible to reduce the scale of arithmetic operations, such as color correction processing. Accordingly, highly precise image processing can be performed at high speed through an inexpensive arrangement.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram showing an example of an error diffusion matrix;

FIG. 11 is a diagram showing example of error diffusion matrices;

DESCRIPTION OF THE PREFERRED EMBODIMENTS

Embodiments of the present invention will now be described in detail.

In this embodiment of the present invention, an example will be described in which image processing is executed after an image signal of L (eight) bits has been converted to an image signal of M (four) bits, whereupon the M-bit image signal is converted to an S(=1)-bit image signal.

Figure 1A:
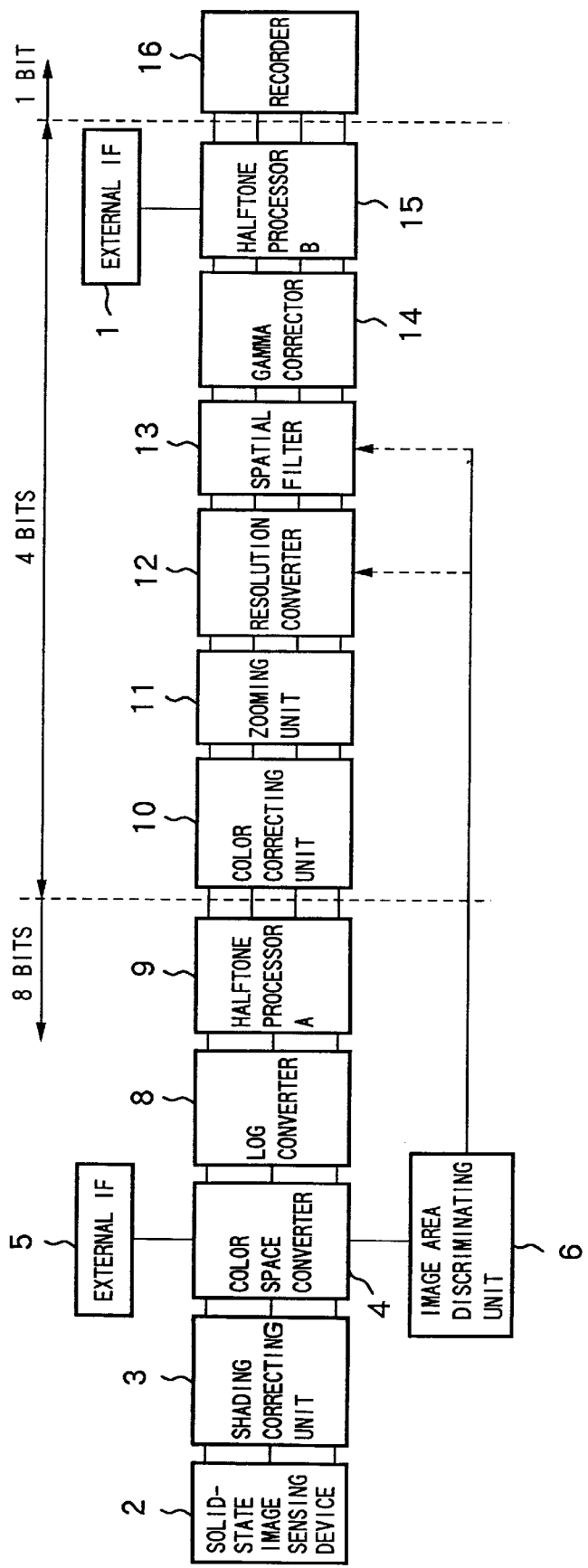
FIG. 1A is a block diagram in which the construction of an image processing apparatus according to an embodiment of the invention is expressed by functional blocks.

The construction of an image processing apparatus according to this embodiment of the invention is illustrated in FIG. 1A. Unevenness of an image signal that has been read by a solid-state image sensing device (a sensor 2) at a density of 400 dpi (dots per inch) is corrected by a shading correction unit 3 to obtain a uniform image, and a filter of the sensor 2 is subjected to a color correction by a color space converter 4. A luminance RGB signal from the color space converter 4 is converted to a CMY signal, which has an 8-bit density level, by a logarithmic converter 8. The CMY signal is converted to a 4-bit pseudo-halftone signal by a halftone processor (A) 9.

With the pseudo-halftone processing executed by the halftone processor 9, only 4-bit, 16-tone density levels can be expressed for each individual pixel. However, if this is viewed spatially in a predetermined area comprising a plurality of pixels, 8-bit density levels are expressed. The density signals obtained by pseudo-halftoning the three colors C, M, Y to signals of four bits each are subjected to a color correction by a color correcting unit 10 based upon the characteristic of a colorant used by a recorder 16. The color-corrected signals are zoomed when necessary by a zooming unit 11, after which the 400 dpi data is converted to a density of 600 dpi by a resolution converter 12. It should be noted that the conversion processing by the resolution converter 12 and the zooming processing by the zooming unit 11 may be executed simultaneously. A spatial filter 13 performs a sharpness correction and eliminates moire. A density correction is carried out by a gamma correcting unit 13. Meanwhile, an image area discriminating unit 6 executes image recognition processing in order that adaptive processing suited to the attributes of the image will be performed by the image converter 12 and spatial filter 13. The image signal pseudo-halftoned to four bits is pseudo-halftoned further to a single bit and the resulting bi-level recording signal is output to the recorder 16. An external interface (IF) 5 and an external interface (IF) 1 respectively input/output the 8-bit and 1-bit image signals to and from an external unit.

A characterizing feature of this embodiment is that the number of bits used in the processing of each pixel of the multivalued image signal is halved using the pseudo-halftone processor 9 so that the scale of arithmetic operations performed by the color correcting unit 10 can be reduced and so that the size of an image delay memory in a two-dimensional processing section such as the zooming unit 11 and spatial filter 13 can be halved. This makes it possible to lower cost by a wide margin and to speed up processing.

Figure 1B:
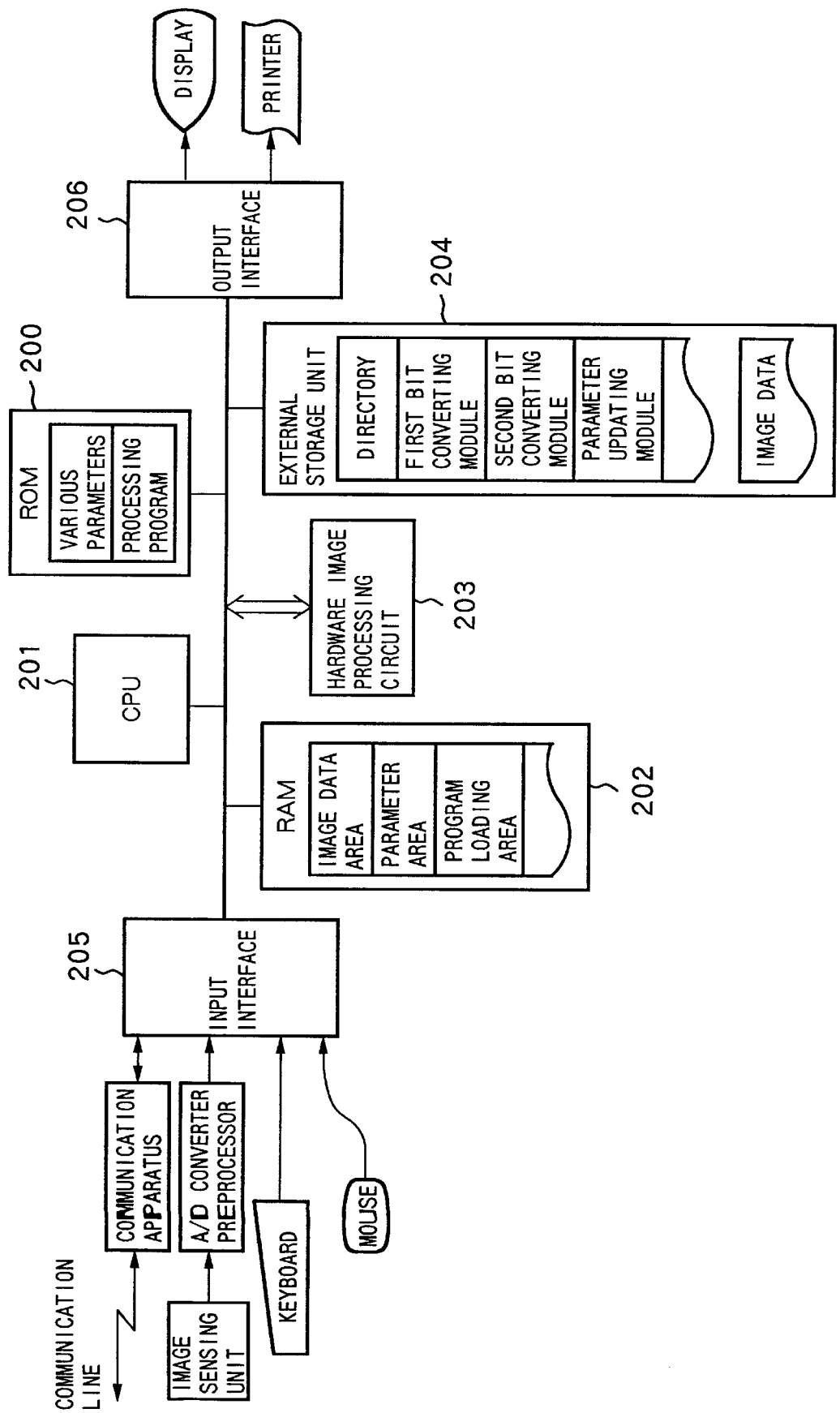
FIG. 1B is a block diagram in which the construction of the image processing apparatus according to this embodiment of the invention is expressed by hardware.

FIG. 1B illustrates an example of the hardware configuration of the image processing apparatus shown in FIG. 1A. For reasons such reasons as processing speed, scale of circuitry and ease of modification, the functional blocks of FIG. 1A each select a hardware configuration or software processing. A hardware image processing circuit 203 shown in FIG. 1B illustrates, in abstract form, a circuit which corresponds to a functional block that has selected a hardware configuration. A plurality of circuits are included.

Further, according to this embodiment, the elements from the color correcting unit 10 to the halftone processor (B) 15 execute processing based on four bits, and the scope of software processing is broadened in terms of processing speed.

Also shown in FIG. 1B are a processing CPU 201 for controlling the operation of overall image processing, a ROM 200 storing programs executed by the CPU 201 as well as various parameters that do not change, a RAM 202 which provides an image data area, an area for storing parameters that need to be changed, and an area for loading a program when the program is executed upon being loaded externally, an external storage unit 204 such as a floppy disk or CD-ROM which stores a directory for loading programs into the RAM 202, a first bit conversion module, a second bit conversion module, a parameter update module and input/output image data, an input interface 205 for communicating image data with a line via a transmitting apparatus, entering an image signal, which has been read by an image sensor, upon A/D converting and pre-processing the image signal, and entering designation data from a keyboard or pointing device (mouse), etc., and an output interface to which a display unit and printer for outputting a processed image are connected.

[First embodiment of halftone processor (A) 9]

Figure 2:
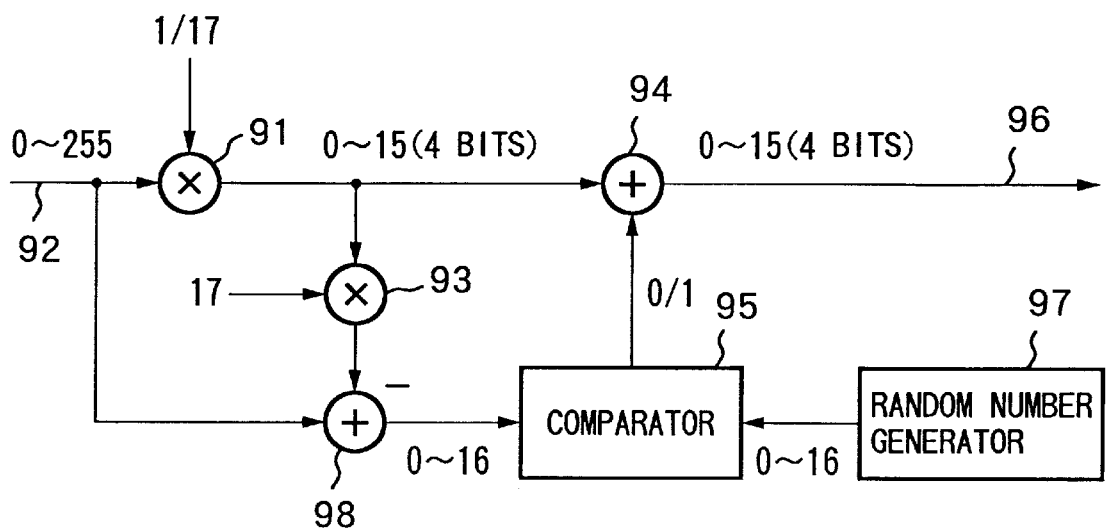
FIG. 2 is a block diagram illustrating the construction of a halftone processor A according to a first embodiment.

FIG. 2 illustrates an embodiment of the halftone processor (A) 9 for one color among the 8-bit density signals C, M, Y resulting from the logarithmic conversion applied by the logarithmic converter 8. The halftone processors for the two remaining colors have the same construction as that illustrated here. If a density signal 92 from the logarithmic converter 8 is multiplied by $1/17$ in a multiplier 91, the result is a 4-bit signal. If this signal is multiplied by 17 in a multiplier 93 and the product is subtracted from the original 8-bit signal 92 by an adder 98, the remainder (0~16), which is the result of multiplying the density signal 92 by $1/17$ in the multiplier 91, is obtained. If this remainder signal is binarized, without inclusion of an equal sign, by a comparator 95 to 1 if it is larger than a signal (1~16) obtained by a pseudo-random number generator 97 and to 0 if it is smaller than the signal (1~16), then a 1-bit signal will be obtained. The 1-bit result of comparison is added, by an adder 94, to the 4-bit signal obtained by multiplying the abovementioned density signal by $1/17$ in the multiplier 91. This provides a 4-bit pseudo-halftoned signal 96.

Since values of 0~16 are generated as pseudo-random numbers substantially uniformly in a neighboring area of 17 pixels or more, the 8-bit density is substantially expressed artificially in the area of 17 pixels. Accordingly, even through 8-bit data is reduced to 4-bit data, subsequent image processing can be applied to the input data faithfully.

[Second embodiment of halftone processor (A) 9]

Figure 3:
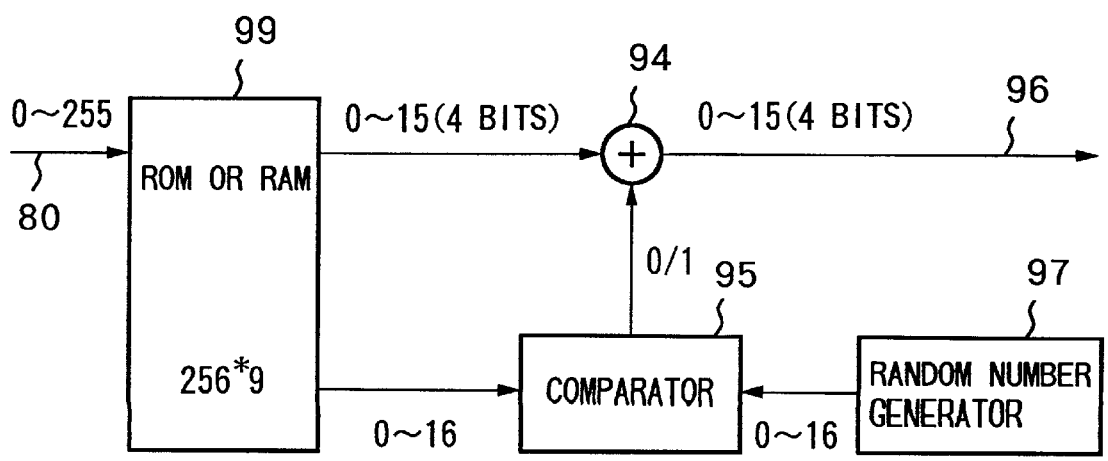
FIG. 3 is a block diagram illustrating the construction of the halftone processor A according to a second embodiment.

FIG. 3 illustrates an example in which the product (four bits) obtained by dividing the 8-bit signal by 17 as described in detail in FIG. 2 and the remainder signals 0~16 are obtained by a so-called LUT conversion utilizing a memory 99. This can be implemented by a 256-word, 9-bit RAM or ROM. In order that the logarithmic conversion may be carried out at the same time, the input to the memory 99 is made the signal that prevails prior to the logarithmic conversion, namely an output signal 80 from the color space converter 4. Since the embodiment of FIG. 3 can be implemented merely by enlarging the usual logarithmic converting LUT by one bit, this embodiment can be practiced at lower cost.

[Third embodiment of halftone processor (A) 9]

Figure 4:
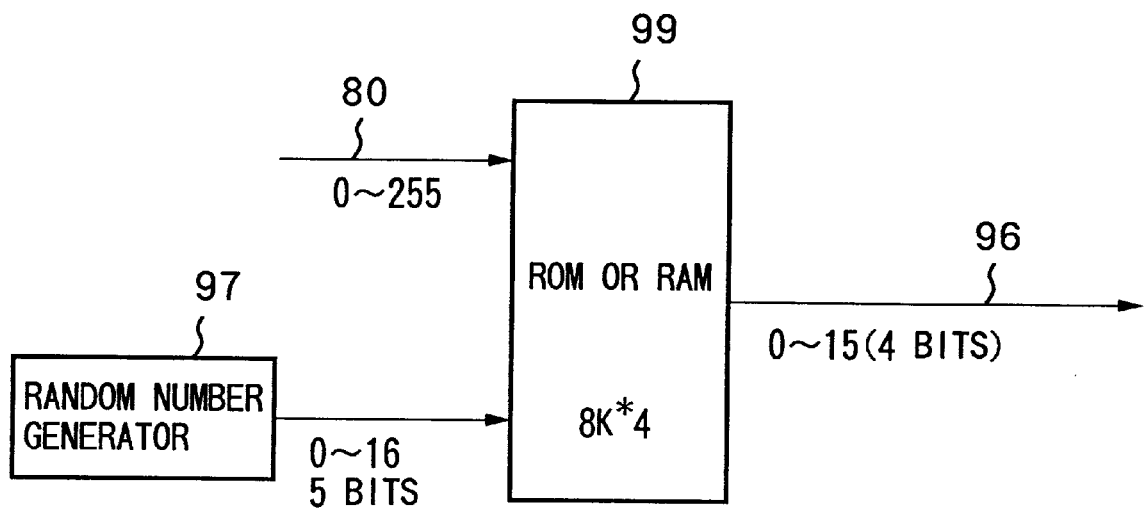
FIG. 4 is a block diagram illustrating the construction of the halftone processor A according to a third embodiment.

FIG. 4 shows another embodiment in which binarization by random numbers and addition are implemented by a LUT conversion. A 5-bit random number is applied as the input to the memory 99. Accordingly, the memory 99 is an 8000-word, 4-bit memory. This is effective in case of a system having a slow processing speed or in a case where operation is implemented by software in a computer.

It should be noted that the pseudo-halftone processor (A) 9 for pseudo-halftoning from eight to four bits is not limited to the embodiments shown in FIGS. 2 through 4. The error diffusion method, which is accompanied by an error correction, the method described in the specification of Japanese Patent Application Laid-Open No. 2-210963 already disclosed by the inventor, and density preserving pseudo-halftone processing can all be applied. Further, in this embodiment, a conversion from eight bits to four bits is disclosed as one example. However, in a case where recording and reading resolution is sufficiently high, the same results can be obtained even if processing is from eight bits to three bits or from eight bits to two bits.

The details of the color correcting unit 10, which is shown in FIG. 1, will now be described.

(Embodiment of color correcting unit 10)

An embodiment of the color correcting unit 10 will now be described with reference to FIG. 5. Basically, black generation and color correction carried out by the conventional matrix operation need only be implemented with respect to the 4-bit C, M, Y input signals. However, since the number of bits in the input is halved, so-called direct mapping using a LUT conversion is possible. More specifically, four color signals C, M, Y, K that have been color-corrected with regard to the combination of C, M, Y signals obtained beforehand by an operation using a 4000-word, 16-bit memory 100 are stored upon being assigned four bits each.

Though there is degeneration to a number of colors expressed by 16 bits with respect to each input pixel, 32-bit color expression is possible if this is viewed uniformly over 17 pixels, as mentioned earlier.

Though well-known techniques are employed in the zooming unit 11, resolution converter 12 and spatial filter 13, it is possible to halve the number of bits of memory for delaying and storing, in line units, the images which accompany each processing operation. With regard to the uniform 8-bit signal, the level fluctuates randomly between 4-bit, neighboring pixels in the above-described pseudo-halftone processor (A) 9. However, if the spatial filter is made a filter of 5×5 pixels centered on the pixel of interest and this filter has weighting coefficients at the positions of all 25 pixels, then the area of referential pixels for processing will have 17 or more pixels, as mentioned above. As a result, there will be very few instances in which noise is produced. Further, in case of an ordinary Laplacian filter, similarly excellent results are obtained if edges are emphasized using only Laplacian components that correspond to a change of level 2 or greater.

With regard to characters, the characteristic of human vision is such that the finer a line, the more difficult it is to distinguish gradation. Therefore, in view of the fact that fine lines on the order of four lines per millimeter are sufficient at a number of tones provided by four bits, there is no decline in the resolution characteristic.

[First embodiment of halftone processor (B) 15]

Figure 6:
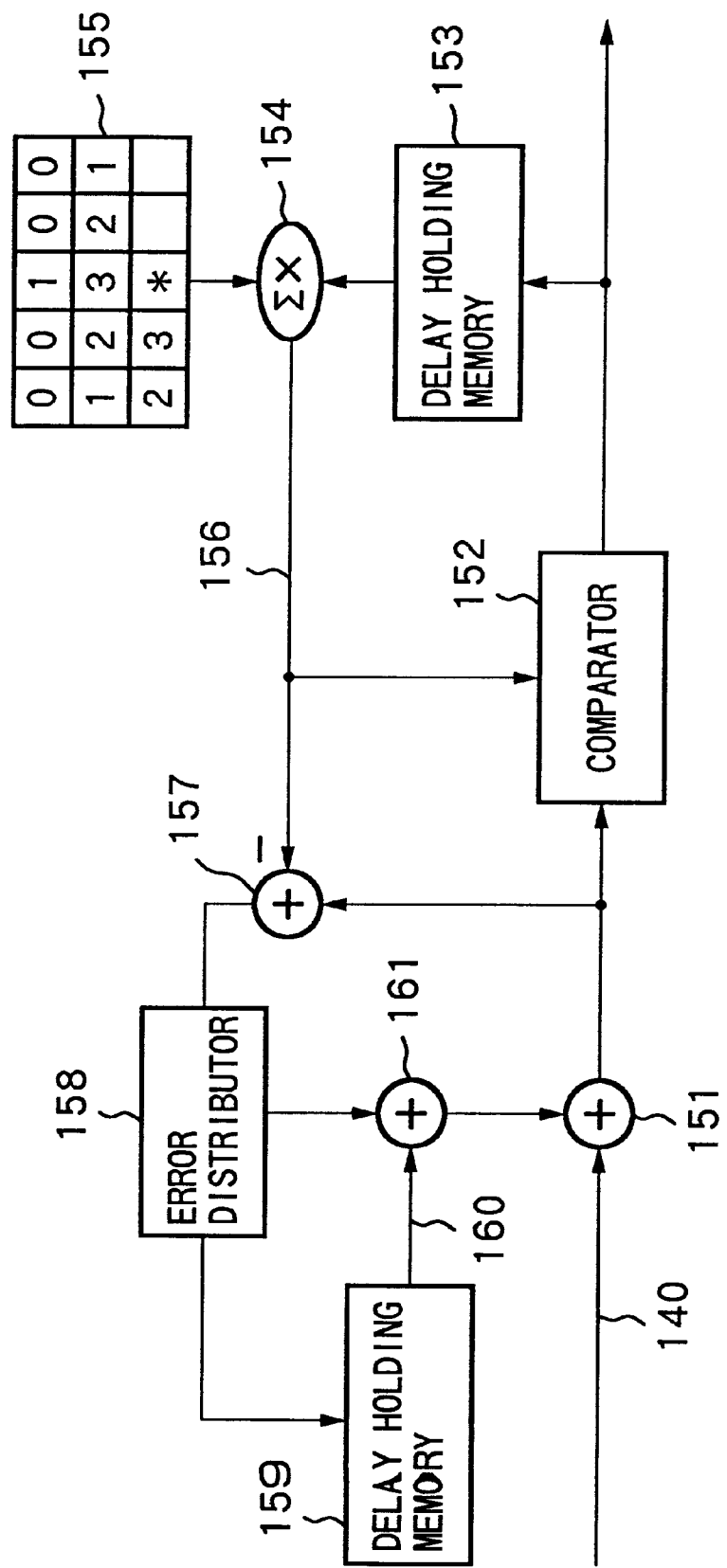
FIG. 6 is a block diagram illustrating the construction of a halftone processor B according to the first embodiment.

FIG. 6 illustrates an embodiment of the halftone processor (B) 15. This halftone processor pseudo-halftones a 4-bit signal 140 from the gamma corrector 14 to a single bit.

Binarization error obtained when neighboring pixels are binarized is added to the input signal 140 by an adder 151 and the sum is binarized by a comparator 152. The threshold value at the time of binarization is obtained by holding the binarized signal in a two-line delay memory 153 and taking the sum of the products of bi-level data binarized in the past and weighting coefficients 155 using a multiply-and-accumulate arithmetic unit 154. It should be noted that the sum total of the weighting coefficients used here is assumed to be 15.

The difference between the same threshold value and error-corrected signal is obtained by an adder 157. This is the binarization error. This error is branched in two directions by an error distributor 158. One signal is applied to an adder 161 as an error for when the next pixel is binarized, and the other signal is applied to the adder 161 after it is delayed by one line in a single-line delay memory 159.

Accordingly, the binarization error of a pixel of interest (*) is obtained by adding the immediately preceding binarization error and that which is one line earlier in the adder 161. Thus the input signal 140 is corrected by the adder 151.

It should be noted that the binarization technique used by the halftone processing (B) 15 is not limited to that of the foregoing embodiment. A density preserving technique such as the error diffusion method may be used. Further, in a case where the recording display unit is a 2-bit device, i.e. has the ability to express four values, the 4-bit signal is processed to a 2-bit signal.

Thus, in order to reduce the scale of hardware when various image processing is executed in accordance with this embodiment, the number of bits of the input image data is reduced using multivalued pseudo-halftone processing and then various processing such as color correction is executed, after which binarization for the purpose of recording is carried out by performing pseudo-halftone processing again.

Figure 7:
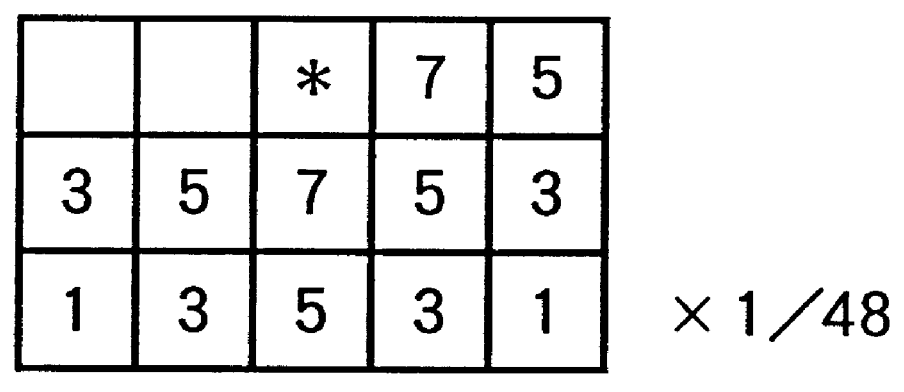

It is known that the area in which error is diffused should be made sufficiently large in order to express halftones with excellent texture using the error diffusion method. In a case where 8-bit image data is processed, error distribution on the order of E/48 (where E is the binarization error generated by the pixel of interest) at minimum is required with regard to 12 pixels neighboring the pixel of interest, as shown in FIG. 7. The error generated is on the order of the range of the input image signal. In the case of a 4-bit image signal, the distributed error based upon this error distribution rate is zero in almost all cases. More specifically, performing the error correction at the desired distribution rate in the 12-pixel area is impossible. In other words, it is difficult to obtain an excellent halftone image similar to that of the prior art with regard to an image signal having a small number of bits.

Accordingly, a pseudo-halftone processing method through which binarization error can be diffused in a wider area with regard to an image having a small number of input bits so that halftones can be expressed with excellent texture will now be described as an embodiment of the halftone processor (B) 15.

[Second embodiment of halftone processor (B) 15]

Figure 8:
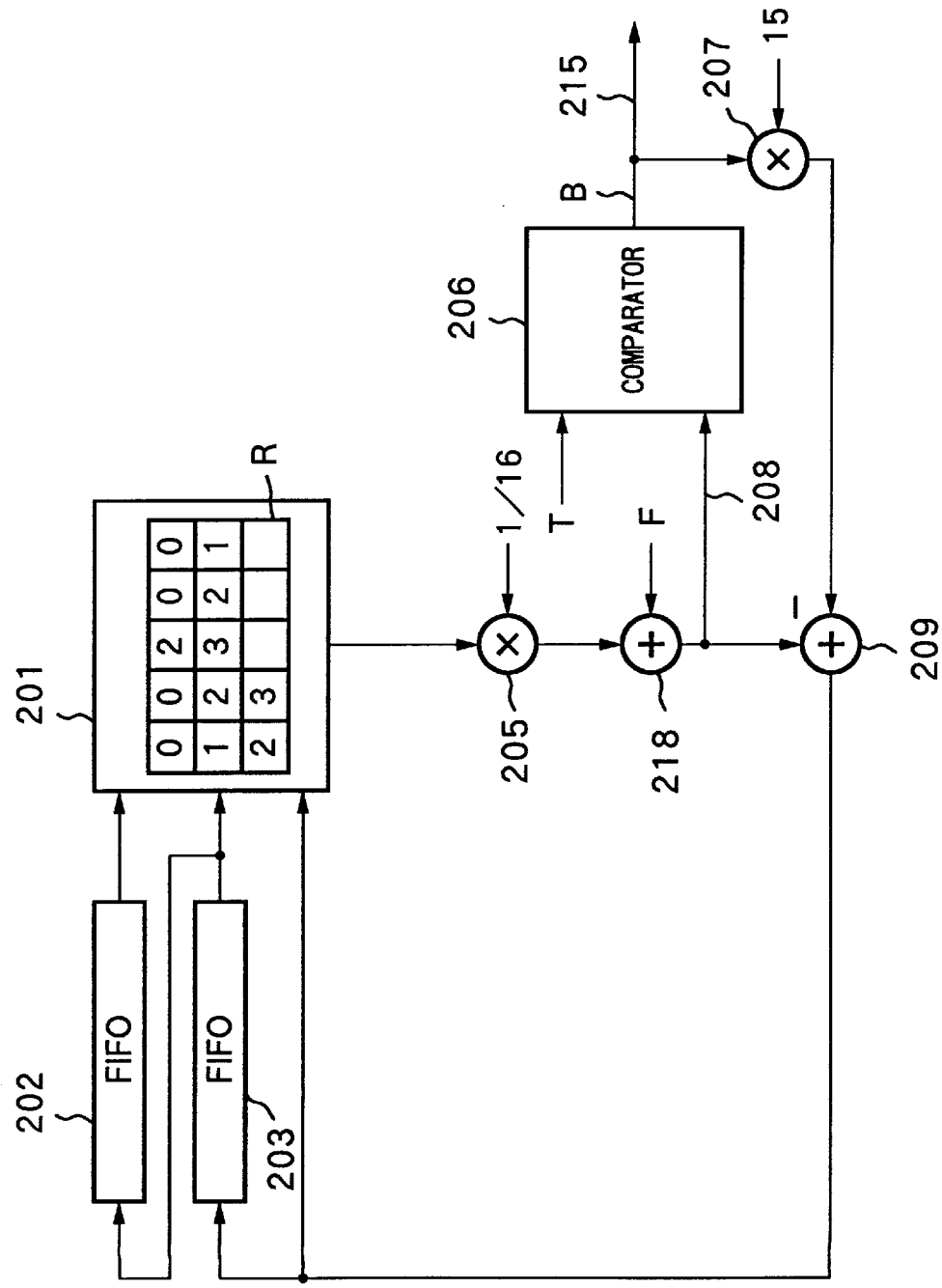
FIG. 8 is a block diagram illustrating the construction of the halftone processor B according to the second embodiment.

FIG. 8 is an embodiment for a case where a 4-bit (0~15) image signal F from the gamma corrector 14 is binarized. Error correction data, described later, and the input signal F are added by an adder 218, the output 208 of which is binarized by a comparator 206 using a predetermined desired threshold value T.

Binarization error E of the pixel of interest is given by the following equation:

$$E = (F + \Sigma E^* R) - B^* 15$$

where B represents 215, which is the result of binarizing the pixel of interest, and $\Sigma E^* R$ is the weighted mean value of binarization error, which has been generated at a pixel position at which binarization has already been finished in the vicinity of the pixel of interest, and error with regard to the pixel of interest using a weighting coefficient R.

Accordingly, the error E is obtained by subtracting a value, which is obtained by multiplying the binarization result 215 by 15 in a multiplier 207, from image data 208 following the error correction described above.

FIFOs 202, 203 each delay the error by one line and then enter the error into a weighted mean-value circuit 201 together with the binarization error of the line of the pixel of interest.

The weighted mean-value circuit 201 is a multiply-and-accumulate arithmetic unit capable of simultaneously referring (by a latch circuit, which is not shown) to binarization errors generated at 12 pixel positions neighboring the pixel of interest at which binarization has already been finished. The weighted mean-value circuit 201 multiplies the binarization error at this pixel position by the weighting coefficients illustrated and sums the products. The sum total of the weighting coefficients is 16. Therefore, if this result is multiplied by 1/16 in a multiplier 205, the correction error E with regard to the position of the pixel of interest is obtained.

The characterizing feature of this embodiment resides in the fact that error generated is itself delayed and held and a corrected error is obtained by taking the weighted mean when the pixel of interest is binarized. The binarization error generated at the position of the pixel of interest is not distributed to several pixels.

As a result, it is possible to reflect error having a small distribution rate (a small weighting value) in the pixel of interest without computation error.

Figure 9:
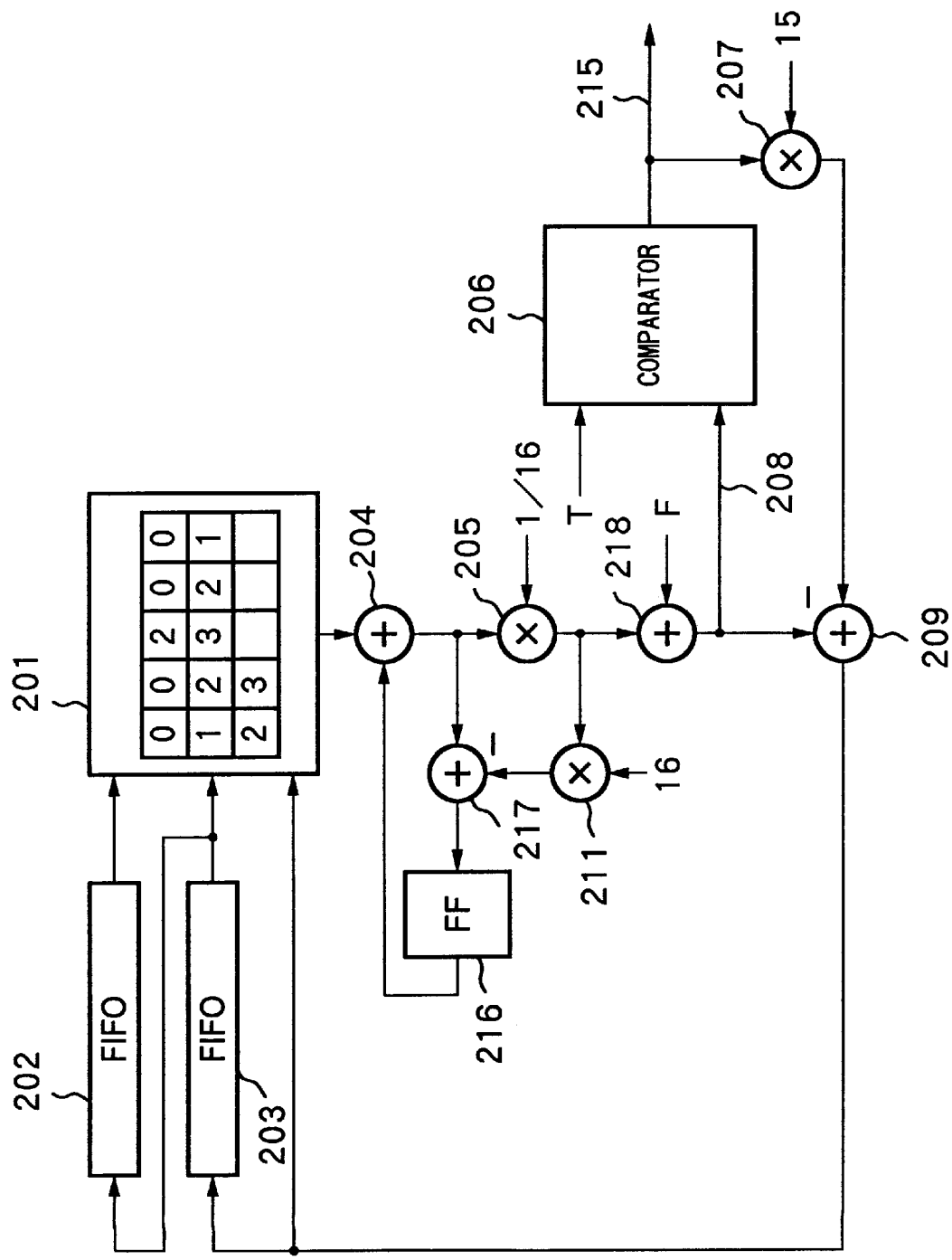
FIG. 9 is a block diagram showing another construction of the halftone processor B.

Truncation error of a maximum of 15 is generated in the multiplier 205. FIG. 9 shows an example in which this calculation error is corrected further.

In FIG. 9, the result of the operation performed by the multiplier 205 is multiplied by 16 in a multiplier 211 and the product is subtracted from the input value of the multiplier 205 by an adder 217. As a result, calculation error, namely truncation error, is obtained. This error is delayed and held by a flip-flop 216 for the time needed to process one pixel and the error is added to the above-mentioned weighted mean value by an adder 204, thereby ending the correction.

In other words, truncation error can be corrected in terms of the next pixel. This makes perfect error correction possible. In a case where the sum total of the weighting coefficients is large, the correction of this embodiment is particularly effective and makes possible halftone expression of higher quality.

Figure 10:
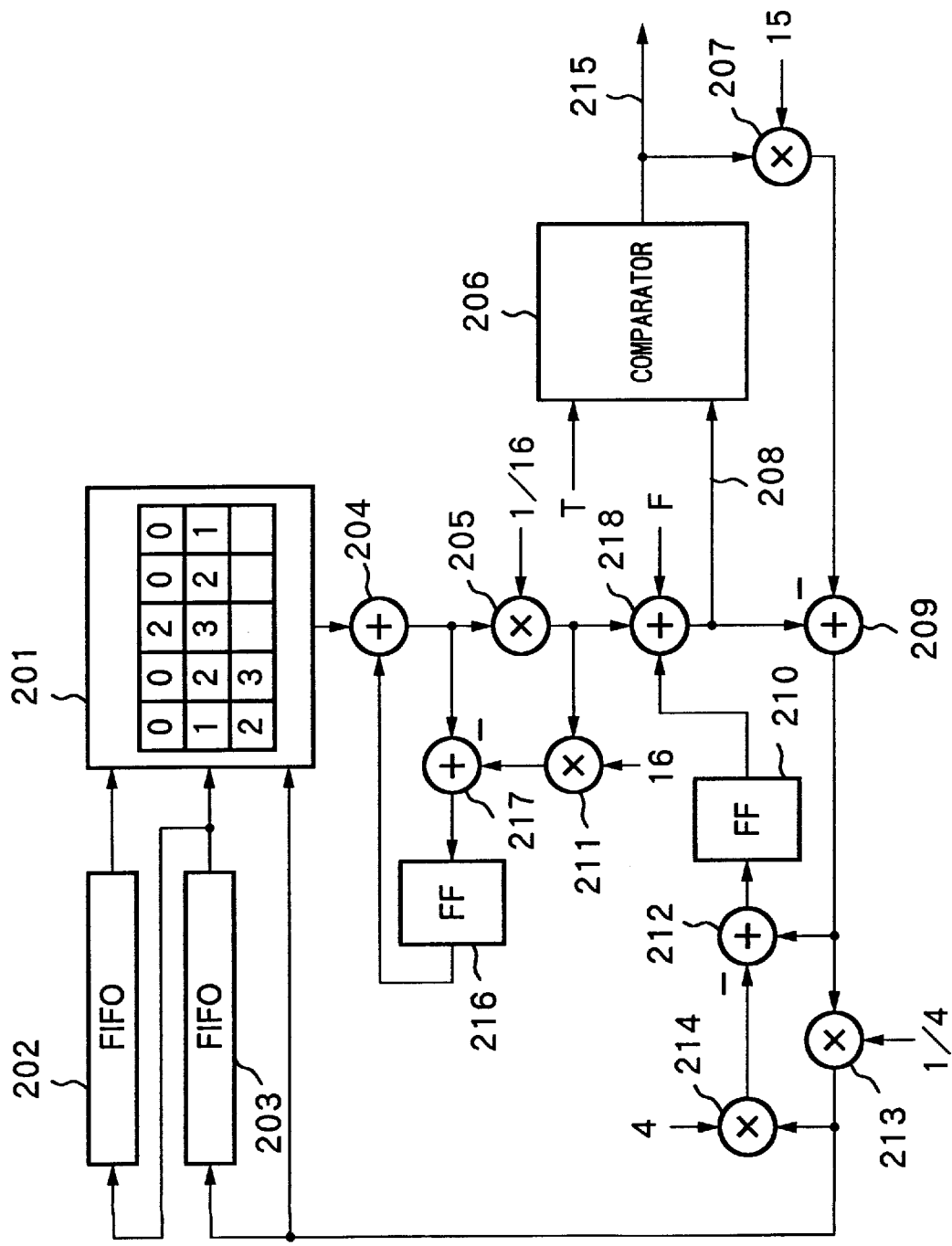
FIG. 10 is a block diagram showing another construction of the halftone processor B.

FIG. 10 illustrates an example in which the bit width of error memories 203, 202 has been reduced. The above-mentioned error E is required to consist of six bits, inclusive of a polarity bit, with regard to a 4-bit image signal. In order to reduce the number of bits by two, the two lower order bits in the error obtained by a multiplier 213 are truncated. If the result is multiplied by four by a multiplier 214 and the product is subtracted from the input to a multiplier 213 by an adder 212, a truncation error is obtained. If this error is delayed by one pixel and held by a flipflop 210 and then applied to an adder 218, the error can be corrected. That is, the two lower order bits of the generated error are truncated to reduce the bit width of the error memory, thereby lowering cost. The truncated two bits undergo error correction successively when the next pixel is binarized.

It goes without saying that, in this case, each item of input error data is operated upon by being bit-shifted by a factor of four in the weighted mean-value circuit 201, though the details are not described here.

The foregoing processing may be carried out by the output unit of the FIFO 203. Specifically, the FIFO 202 is such that, in this example, the weighting coefficient regarding the referenced pixel farthest from the line that contains the pixel of interest is 2, which is small. Accordingly, the number of bits can be reduced further. Since the reduced data is corrected at the next pixel in this case also, there is no deterioration in the binarized image.

Similarly, the numbers of bits of the FIFOs 202, 203 can be reduced by limiting the binarization error of the pixel of interest, obtained by the adder 209, over a predetermined range. That is, five bits are obtained by limiting the generated error within the range 15~+15. In a case where this range is exceeded, the amount of excess error is subjected to an error correction at binarization of the next pixel in a manner similar to the error correction processing of FIG. 10. Since it is usually not possible for an error of a maximum value of +15 to occur continuously, a correction is possible for neighboring pixels.

It should be noted that the weighting coefficients for obtaining the error are not limited to those of this embodiment. For example, the three matrices shown in FIG. 11 can be used.

Thus, the second embodiment of the halftone processor B is an error diffusion method applied to an image signal in which density has a small number of bits. Binarization error can be diffused over a wider area. As a result, halftones can be reproduced with excellent texture. In addition, the scale of hardware can be reduced.

It goes without saying that the present invention is not limited to recording and display schemes such as electrophotographic devices using ink-jet technology, LEDs and lasers. Though the embodiments relate to a color apparatus, the same effects are obtained even in a monochrome apparatus.

[Image processing apparatus according to other embodiments]

Generally, in an image processing apparatus, various image processing is applied to image data that has been entered from an input unit, after which the processing image data is output by an output unit. For example, in the case of a color copier, 8-bit image data for each of R, G, B read in from a scanner is subjected to a logarithmic conversion so as to be converted to C, M, Y signals, after which color correction processing is executed to effect a correction to an 8-bit signal for each of C, M, Y, K upon taking into account the color reproduction characteristics of the printer.

In this conventional image processing apparatus, however, a matrix operation is performed as the color correction processing. The greater the number of bits representing one pixel, the greater the quantity of arithmetic operations performed. If it is attempted to perform image-quality adjustment processing such as color balance adjustment or density adjustment at the same time, the quantity of arithmetic operation is increased further.

Accordingly, in order to deal with these arithmetic operations of such large quantity, the conventional image processing apparatus subjects the 8-bit 3-color signals to multiply-and-accumulate processing using hardware such as an ASIC or the like, thereby implementing color correction processing. An unavoidable consequence is an increase is cost.

This embodiment illustrates an example of an image processing apparatus in which highly precise color correction processing is capable of being performed at high speed by an inexpensive arrangement.

Construction of image processing apparatus

Figure 12:
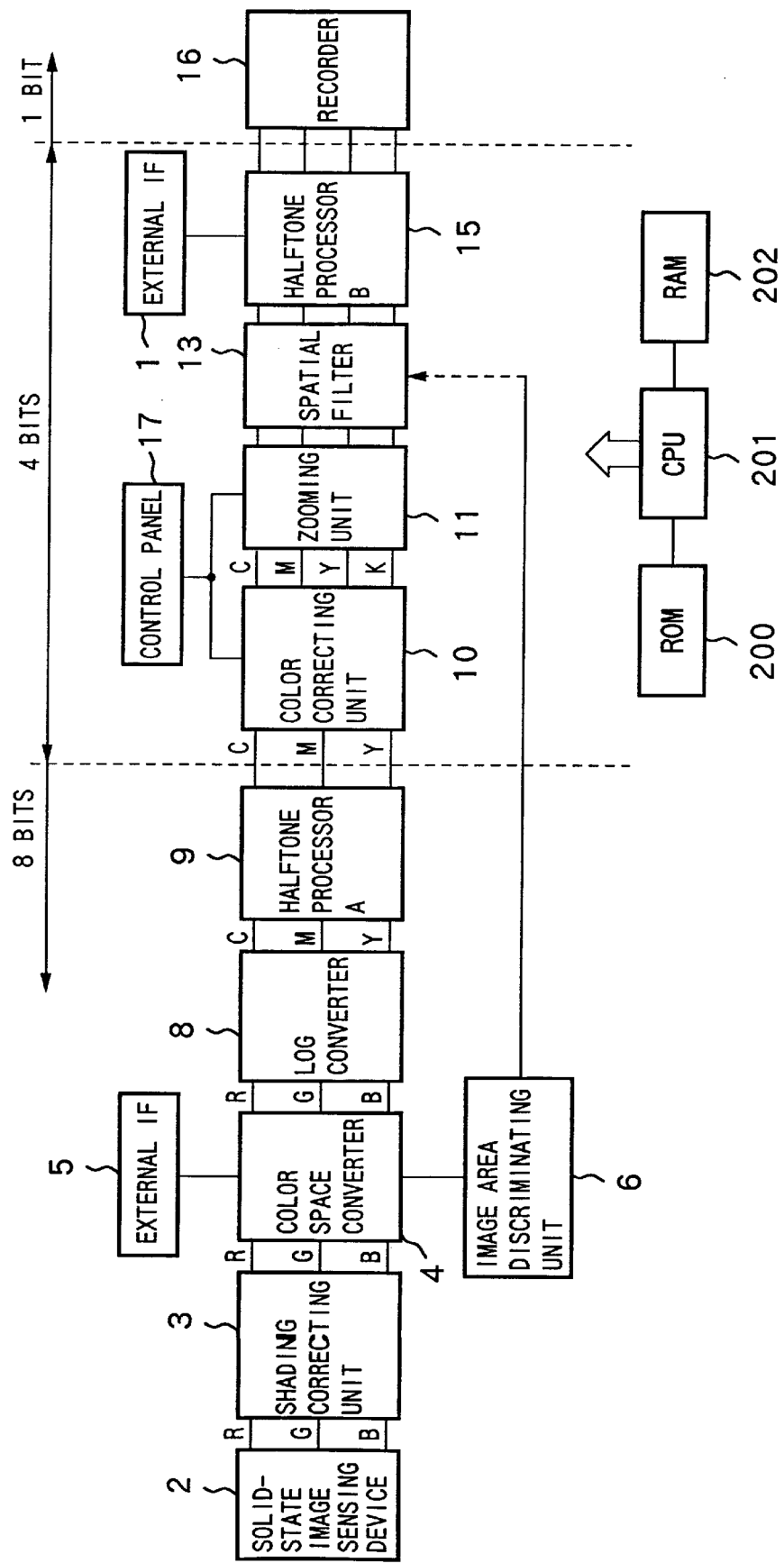
FIG. 12 is a block diagram in which the construction of an image processing apparatus according to another embodiment of the invention is expressed by functional blocks.
Figure 13:
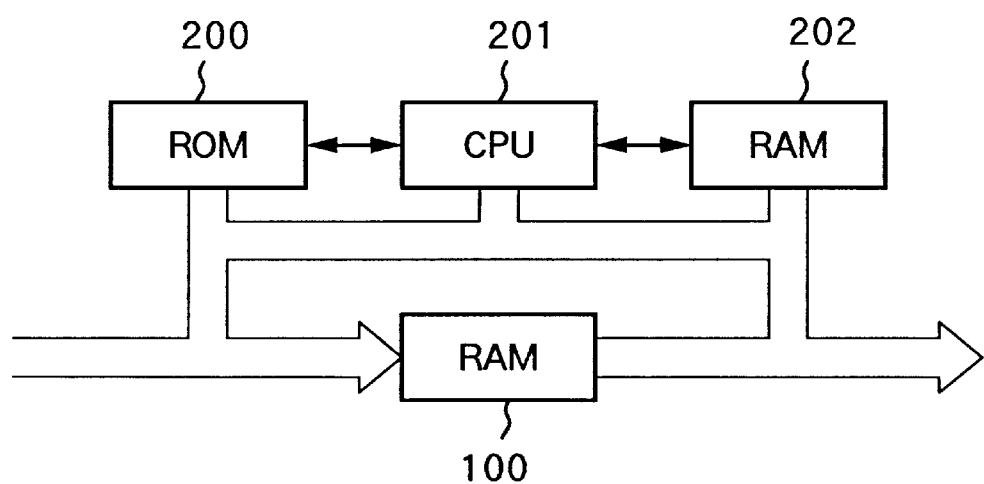
FIG. 13 is a diagram showing an arrangement for updating a RAM contained in a color correcting unit according to another embodiment

FIG. 12 is a functional block diagram of an image processing apparatus to which this invention is applied. unevenness in the quantity of light of an image signal that has been read by the sensor 2, such as a CCD, is corrected by the shading correction unit 3 to obtain a uniform image, and the sensor filter is subjected to a color correction by the color space converter 4. The luminance RGB signal thus obtained is converted to a CMY signal, which has an 8-bit density level, by the logarithmic converter 8. The CMY signal is converted to a 4-bit pseudo-halftone signal by the halftone processor (A) 9. Though the details of the processing executed by the halftone processor 9 will be described later, the result of the processing is that although only 16 tone density levels can be expressed for each individual pixel, 8-bit density levels are expressed by grasping this spatially in a predetermined area. In this embodiment, an image signal having an 8-bit level is halved to a 4-bit level artificially, whereby two-dimensional processing (color correction, zooming, spatial filter processing, etc.) executed in subsequent stages can be simplified.

The 3-color density signals obtained by pseudo-halftoning to four bits are subjected to a color correction by the color correcting unit 10 based upon the characteristic of a colorant used by the recorder 16. In this embodiment, color generation processing also is executed at the same time so that a K signal is generated. The C, M, Y, K signals are zoomed when necessary by the zooming unit 11, and the spatial filter 13 performs a sharpness correction and eliminates moire. Meanwhile, the image area discriminating unit 6 executes image recognition processing in order that adaptive processing conforming to the attributes of the image will be performed in each of the above-mentioned processing units. Particularly, in this embodiment, in order to carry out image-area discrimination so that a black character portion contained in an image will be recorded sharply monochromatically in the color black, the result of this discrimination is entered into the spatial filter 13.

The halftone processor B converts the image signal, which has been pseudo-halftoned to four bits, to a 1-bit image signal. More specifically, the halftone processor B outputs a bi-level image signal as the recording signal in the recorder 16.

A control panel 17 allows the operator to enter an image-quality adjustment command to the color correcting unit 10 and a zoom command to the zooming unit 11. The external IF 5 and the external IF 1 respectively input/output the 8-bit and 1-bit image signals to and from an external unit, not shown.

A CPU 201 performs overall control of the blocks shown in FIG. 1 based upon a control program stored in a ROM 200. A RAM 202 is used as the working area of the CPU 201.

Halftone processor A

With regard to the details of the halftone processor 9 described above, the elements illustrated in FIGS. 2 through 4 are used in this embodiment as well.

Color correcting unit

Figure 5:
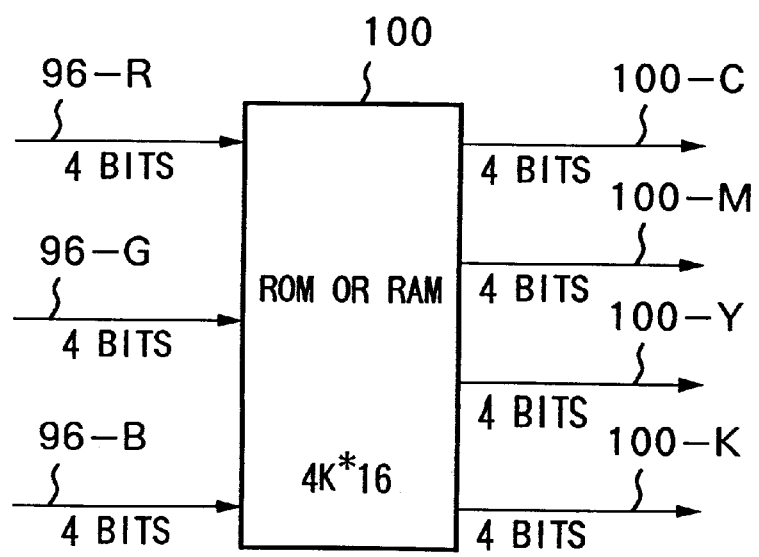
FIG. 5 is a block diagram showing the construction of a color correcting unit.

The details of construction of the color correcting unit 10 are the same as those shown in FIG. 5. In this embodiment, the RAM 100 is used and the content thereof is changed. Basically, in this embodiment as well, black generation and color correction processing carried out by the conventional matrix operation need only be implemented with respect to the 4-bit C, M, Y input signals. Since the number of bits of the image signal into to the color correcting unit 10 is halved, so-called direct mapping using a LUT conversion is possible. More specifically, four color signals C, M, Y, K that have been color-corrected with regard to the combination of C, M, Y signals obtained beforehand by an operation using the 4000-word, 16-bit memory 100 are stored upon being assigned per each 4-bit signal entered in advance.

In this embodiment, the number of colors expressed degenerates to 16 bits (4 bits×4 colors) when viewed with regard to one pixel. However, 32-bit (8 bits×4 colors) color expression is possible if this is grasped uniformly over 17 pixels, as mentioned earlier.

With regard to the RAM 100 in the color correcting unit of this embodiment, image-quality adjustment processing such as color balance adjustment and density adjustment of each color is executed at the same time as ordinary color correction processing based upon the above-mentioned color correction data. This image-quality correction processing is executed based upon adjustment values designated by the operator at the control panel 17 in such a manner that color balance and density will take on desired values. Accordingly, it is required that data stored in the RAM 100 be made to constantly reflect these adjustment values designated by the operator.

The color balance adjustment will be discussed first. Assume that the control panel 17 is equipped with a color-balance adjustment scale having 17 graduations from +8 to −8. With regard to color balance A output in response to a currently prevailing setting at graduation 0, the conversion formulae for color balance at a graduation i are expressed as follows:

$$i>0: A\times16/(16-i)$$
$$i<0: A\times(16+i)/16 \quad (1)$$

That is, it will suffice to perform a linear conversion in such a manner that A×16/8 is attained at graduation +8, A×16/14 is obtained at graduation +2 and A×15/16 is obtained at graduation −1.

The density adjustment will now be described. Assume that the output signal under ordinary circumstances is B with regard to all 4-color signals after the color correction. In a case where it is desired to obtain maximum brightness, for example, an arithmetic operation in accordance with the following expression generally is carried out:

$$(B-32)\times8/16 \quad (2)$$

However, the signal B in the general expression (2) is an 8-bit signal. Even if the arithmetic operation of expression (2) is applied to the 4-bit signal in accordance with this embodiment, the error will be large and good results will not be obtained.

Accordingly, in this embodiment, each of the input 4-bit C, M, Y signals are multiplied by 17 to obtain 8-bit random data as the color correction data which prevails at the time of ordinary setting, a so-called masking operation in accordance with a conventional algorithm is applied and the result is stored temporarily in the ROM 200 as the 8-bit C, M, Y, K signals (4000×8×4 bits).

An operation indicated by expression (2) that accompanies the above-mentioned adjustment is applied to each 8-bit signal by the CPU 201 in response to a command from the operator and the result is rounded to four bits and written to the RAM 100. By virtue of this operation, the arithmetic results accompanying each adjustment can be reflected in the 4-bit signal continuously. It should be noted that signals of the four higher order bits of the result of the arithmetic operation may be stored successively in the RAM 202 and, when application of the operation to all data has been completed, the results may be transferred collectively to the RAM 100.

Further, the 8-bit data stored in the ROM 200 is capable of being made data obtained by reverse-orrecting the non-linear characteristic peculiar to the recording unit 16. Furthermore, the arithmetic operation performed by the CPU 201 is not limited to the above-mentioned linear operation but can be a non-linear operation. In order to perform the non-linear operation at high speed at this time, the fundamental data of each 8-bit signal need only be subjected to a so-called LUT conversion.

It should be noted that the bit width of the RAM 100 in this embodiment is not limited to four bits. If the resolution of the original image data is high, it is possible to make the bit width three bits or two bits. In such case the number of bits of the input signal to the RAM 100 and the number of bits of the output signal need not necessarily be the same.

Furthermore, in this embodiment, an example is described in which the result of applying a logarithmic conversion to the RGB signal and performing pseudo-andom halftoning to four bits is subjected to so-called masking and UCR (black generation) processing using the RAM 100, thereby generating the CMYK signal. However, this embodiment is not limited to this example. For example, it is possible to make the RGB signal a 4-bit signal and effect a conversion to a L*a*b signal by the same RAM. In any case, even though the input signal degenerates to a small number of bits, the original information is preserved two-dimensionally in the peripheral image and therefore the original density information is preserved in this embodiment.

Halftone converter B

The elements shown in FIG. 6 and FIGS. 8 through 10 are ideal for use in the halftone converter B.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

The storage medium, such as a floppy disk, hard disk, optical disk, magneto-optical disk, CD-ROM, CD-R, magnetic tape, non-volatile type memory card or ROM can be used to provide the program codes.

Further, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for processing a multivalued image signal, comprising:

first halftone processing means for applying pseudo-halftone processing to an L-bit image signal to thereby generate an M-bit image signal, where M<L holds, said first halftone processing means having means for generating a quotient and a remainder obtained by dividing input data by a predetermined value and said first halftone processing means having means for generating lower order bits based upon a comparison between the remainder and a random-number value;

image processing means for executing image-signal multivalued processing using the M-bit image signal; and second halftone processing means for generating, from the multivalued-processed M-bit image signal, an image signal of predetermined bits corresponding to output means, wherein said first and second halftone processing means perform halftone processing in a density preserving type quantizing method.

2. The apparatus according to claim 1, wherein said image processing means includes:

color correcting means for performing a color correction such as black generation by processing;

zooming means having an image delay memory; and spatial filter means.

3. The apparatus according to claim 2, wherein said first halftone processing means generates a 4-bit image signal from an 8-bit image signal, and said color correcting means is a LUT having a 12-bit input.

4. An image processing apparatus for processing a multivalued image signal, comprising:

first halftone processing means for applying pseudo-halftone processing to an L-bit image signal to thereby generate an M-bit image signal, where M<L holds, said first halftone processing means has means for generating a quotient and a remainder obtained by dividing input data by a predetermined value and said first halftone processing means having means for generating lower order bits based upon a comparison between the remainder and a random-number value;

means for creating output data from the quotient and lower order bits;

image processing means for executing image-signal multivalued processing using the M-bit image signal wherein said image processing means includes:

color correcting means for performing a color correction such as black generation by processing;

zooming means having an image delay memory; and spatial filter means; and second halftone processing means for generating, from the multivalued-processed M-bit image signal, an image signal of predetermined bits corresponding to output means, wherein said first and second halftone processing means perform halftone processing in a density preserving type quantizing method.

5. The apparatus according to claim 4, wherein at least one of said means is a LUT.

6. The apparatus according to claim 1, wherein said second halftone processing means includes:
   means for delaying and holding an error generated when a conversion to S bits is made;
   means for obtaining a weighted mean value using conversion errors and whole-number coefficients of a plurality of pixel positions neighboring a pixel of interest;
   error correcting means for correcting an input image signal of the pixel of interest by a value obtained by dividing the weighted mean value by the sum total of the coefficients;
   converting means for converting this corrected value to an S-bit signal; and
   means for calculating an error generated by the conversion.

7. The apparatus according to claim 6, wherein said error correcting means corrects an error, which is generated by division, when a neighboring pixel is converted.

8. The apparatus according to claim 6, wherein said error calculating means corrects an error, which is generated by rounding of bits, when a neighboring pixel is converted.

9. The apparatus according to claim 6, wherein said error calculating means includes means for reducing generated error to less than a predetermined value and corrects an error, which is generated by reduction processing, when a neighboring pixel is converted.

10. The apparatus according to claim 1, further comprising updating means for updating an image processing method of said image processing means based upon designation of image-quality adjustment.

11. The apparatus according to claim 10, wherein said image processing means includes at least one LUT, and said updating means updates the content of said LUT.

12. The apparatus according to claim 11, wherein said LUT is a LUT for color correction.

13. An image processing method for processing a multi-valued image signal, comprising the steps of:
   reducing number of bits from L bits to M (<L) bits by pseudo-halftone processing prior to processing of an L-bit image signal by dispersing a remainder to lower order bits of a quotient obtained by dividing input data by a predetermined number of bits;
   performing subsequent multivalued processing of image signal using the M-bit image signal; and
   generating, from the multivalued-processed M-bit image signal, an image signal of predetermined bits corresponding to output means,
   wherein, in said reducing step and generating step, halftone processing in a density preserving type quantizing method is performed.

14. The method according to claim 13, wherein L is 8 and M is 4, and said predetermined number is 17.

15. An image processing method for processing a multi-valued image signal, comprising the steps of:
   reducing number of bits from L bits to M (<L) bits by pseudo-halftone processing prior to processing of an L-bit image signal by diffusing a remainder to lower order bits of a quotient obtained by dividing input data by a predetermined number of bits wherein diffusion of the remainder includes comparing the remainder and a random number and varying the least significant bit of the quotient based upon the results of the comparison;
   performing subsequent multivalued processing of image signal using the M-bit image signal; and
   generating, from the multivalued-processed M-bit image signal, an image signal of predetermined bits corresponding to output means,
   wherein, in said reducing step and generating step, halftone processing in a density preserving type quantizing method is performed.

16. A product comprising a processor readable medium including a program for processing multilevel image data, said program including at least:
   first program code means for controlling reduction of number of bits from L bits to M (<L) bits by pseudo-halftone processing prior to processing of an L-bit image signal the first program code means generating a quotient and a remainder obtained by dividing input data by a predetermined value, the first program code means generating lower order bits based upon a comparison between the remainder and a random-number value;
   second program code means for controlling multivalued processing of a subsequent image signal using the M-bit image signal; and
   third program code means for controlling pseudo-halftone processing from the multivalued-processed image signal to predetermined bits corresponding to output means,
   wherein said first and third program code means perform halftone processing in a density preserving type quantizing method.

17. A product according to claim 16, wherein said processor readable medium further includes image data processed or to be processed.

* * * * *

UNITED STATES PATENT AND TRADEMARK OFFICE
CERTIFICATE OF CORRECTION

PATENT NO. : 6,118,547
DATED : September 12, 2000
INVENTOR(S) : Tanioka

Page 1 of 1

It is certified that error appears in the above-identified patent and that said Letters Patent is hereby corrected as shown below:

Column 2,
Line 67, "embodiment" should read -- embodiment. --.

Column 3,
Line 37, "moire" should read -- moiré. --;
Line 61, "reasons" (second occurrence) should be deleted.

Column 7,
Line 62, "flipflop 210" should read -- flip-flop 210 --.

Column 9,
Line 6, "unevenness" should read -- Unevenness --;
Line 32, "moire." should read -- moiré. --;

Column 11,
Line 22, "pseudo-andom" should read -- pseudo-random --.

Column 12,
Line 54, "signal" should read -- signal, --.

Column 14,
Line 30, "signal" should read -- signal, --.

Signed and Sealed this

Twenty-fifth Day of September, 2001

Attest:

*Nicholas P. Godici*

NICHOLAS P. GODICI
*Attesting Officer*  *Acting Director of the United States Patent and Trademark Office*